Patented Oct. 27, 1953

2,657,233

UNITED STATES PATENT OFFICE 2,657,233

PROCESS OF PREPARING DICARBOXYLIC ACID CHLORIDES

James E. Carnahan, New Castle, Del., assignor to E. I. du Pont de Nemours and Company, Wilmington, Del., a corporation of Delaware No Drawing. Application March 14, 1952, Serial No. 276,691

9 Claims. (Cl. 260—544)

This invention relates to a new method of preparing dicarboxylic acid chlorides.

The usual methods of preparing acid chlorides from carboxylic acids consist in reacting the acid with thionyl chloride, phosphorus trichloride or phosphorus pentachloride. All of these reagents generate undesirable by-products. It has been proposed in the patent literature to use in their place, phosgene (carbonyl chloride) with appropriate reaction catalysts. This method is reported to be quite satisfactory in the preparation of monocarboxylic acid chlorides from monocarboxylic acids provided suitable catalysts are used, particularly with the higher molecular weight acids. However, there is no published report that dicarboxylic acid chlorides have been obtained from dicarboxylic acids and phosgene, with or without the use of catalysts. The fact is, as will be shown later, that the published methods of reacting phosgene with carboxylic acids, which are successful in the treatment of monocarboxylic acids, fail utterly to give dicarboxylic acid chlorides when applied to dicarboxylic acids.

It has now been found that dicarboxylic acid chlorides can be prepared in excellent yields by reacting dicarboxylic acids with phosgene under specific conditions, with the added advantage that no reaction catalysts need be used.

The principal object of the present invention is an improved process for preparing dicarboxylic acid chlorides. A further object is the preparation of dicarboxylic acid chlorides by means of phosgene. Other objects will appear from the following detailed description of the invention.

This invention is a process for preparing dicarboxylic acid chlorides which comprises reacting a dicarboxylic acid with phosgene in the ratio of at least two moles of phosgene per mole of dicarboxylic acid, the reaction being carried out under a phosgene pressure of at least 10 atmospheres and at a temperature of at least 100° C. but below the decomposition point of the dicarboxylic acid chloride.

The reaction is represented by the equation

where R is a divalent organic radical.

The method is illustrated in greater detail in the following examples, in which parts are by weight unless otherwise specified.

EXAMPLE I

A corrosion-resistant pressure vessel was charged with 83 parts (0.5 mole) of terephthalic acid, sealed, cooled, evacuated and charged with 147 parts (1.5 moles) of phosgene from a storage cylinder. The reaction vessel was heated and agitated at 200° C. under autogenous pressure for 5 hours. After cooling and venting the gases, the reaction product (98 parts of solid material) was removed and distilled. There was obtained 93 parts (96% yield) of terephthaloyl chloride distilling at 133–136° C. at 11 mm. pressure and melting at 84.5° C.

In comparison, an attempt was made to react terephthalic acid with phosgene by a published procedure for preparing monocarboxylic acid chlorides, as follows. Terephthalic acid (67 parts, 0.4 mole) in finely divided crystalline form was arranged in a vertical column which measured 22 cm. deep by 3.5 cm. in diameter and was heated to 203° C. while phosgene (1.2 moles) was passed upward through it at a constant rate of flow (0.3 mole per hour) for 4 hours at atmospheric pressure. The terephthalic acid did not liquefy during this treatment but was recovered unchanged in its original powdery condition. Consequently, there was no detectable amount of terephthaloyl chloride produced since the latter is a liquid at temperatures above 80° C.

EXAMPLE II

Following the procedure of Example I, a mixture of 73 parts (0.5 mole) of adipic acid and 147 parts (1.5 moles) of phosgene was heated with agitation at 125° C. under autogenous pressure for 5 hours. There was obtained 84 parts (92% yield) of adipyl chloride distilling at 114° C. at 9 mm. pressure.

In comparison, an attempt was made to react adipic acid with phosgene under conditions reported to produce acid chlorides from monocarboxylic acids, as follows: Adipic acid (73 parts, 0.5 mole) in finely divided crystalline form was arranged in a vertical column that measured 13 cm. deep by 3.5 cm. in diameter and was heated to 122–123° C. while phosgene (1.5 moles) at atmospheric pressure was passed upward through it at a constant rate of flow (0.3 mole per hour) for a period of 5 hours. During this treatment the crystals gradually became sticky but the amount of adipyl chloride that formed, if any, was negligible since the melting point of the product was 140–147° C. Pure adipic acid melts at 151–153° C. while adipyl chloride is a liquid at room temperature and adipic anhydride melts in the range of 20–85° C., depending upon its degree of polymerization.

In a further comparative experiment, one of the catalysts disclosed as favoring the formation of acid chlorides from monocarboxylic acids was used as follows: A suspension of 73 parts (0.5 mole) of adipic acid in 65 parts of xylene containing 5 parts of pyridine, added as catalyst, was heated to 122–123° C. and phosgene (1.8 moles) at atmospheric pressure was bubbled through it at the rate of 0.5 mole per hour for a period of 3.5 hours. The adipic acid gradually dissolved and a clear yellow solution resulted midway through the treatment. On distillation under reduced pressure, a trace (less than 2%) of liquid was collected in the approximate boiling range of adipyl chloride, but essentially all of the reaction product was a non-distillable black tar.

In the process of this invention there can be used any desired dicarboxylic acid, whether it be aliphatic, alicyclic, aromatic, aliphatic-aromatic or heterocyclic. The nature and size of the remainder of the molecule are largely immaterial. It is of course desirable to use an acid free from substituents reactive with phosgene, acid chlorides, or hydrogen chloride under the reaction conditions, in order to avoid interfering side reactions. Additional examples if suitable dicarboxylic acids include oxalic acid, malonic acid, succinic acid, methylsuccinic acid, 2,5-dibromoadipic acid, β-methyladipic acid, pimelic acid, sebacic acid, 1,18-octadecanedioic acid, maleic acid, acetylene-dicarboxylic acid, glutaconic acid, muconic acid, acetone dicarboxylic acid, diglycolic acid, sulfodiacetic acid, sulfodibutyric acid, cyclobutane - 1,4 - dicarboxylic acid, cyclohexane-1,4 - dicarboxylic acid, tetrahydrofurane - 2,5-dicarboxylic acid, phthalic acid, 3-chlorophthalic acid, isophthalic acid, naphthaline - 1,4 - dicarboxylic acid, diphenyl - 4,4' - dicarboxylic acid, diphenylmethane-4,4'-dicarboxylic acid, homoterephthalic acid, β-(4-carboxyphenyl) propionic acid, phenylsuccinic acid, benzylmalonic acid, benzophenone-4,4'-dicarboxylic acid, diphenylsulfone-4,4'-dicarboxylic acid, diphenyl ether-4,4' - dicarboxylic acid, isocinchomeronic acid, quinolinic acid, ethylene dioxyacetic acid. The preferred starting materials are those dicarboxylic acids in which the carboxyl groups are separated by a hydrocarbon chain or by a hydrocarbon chain interrupted by ether oxygen, carbonyl or sulfonyl groups, or in which the carboxyl groups are attached to an aromatic or cyclic group. Another preferred embodiment is the use of mixtures of more than one of such kinds, for instance, mixtures of isophthalic and terephthalic acids, or mixtures of terephthalic with isocinchomeronic acid. The most readily available starting materials are those dicarboxylic acids which, apart from the carboxyl groups, contain only carbon and hydrogen. In this class, the preferred materials are the dicarboxylic acids having a total of 2 to 20 carbon atoms.

For good results, it is desirable to use at least 2 moles of phosgene per mole of dicarboxylic acid. Preferably, a moderate excess over the stoichiometrical amount is used, for example, between 2.2 and 4 moles of phosgene per mole of dicarboxylic acid. Larger excesses of phosgene can be used if desired but there is no advantage in doing so.

The use of a superatmospheric phosgene pressure is critical, as has been shown. For good results, the phosgene pressure in the system should be at least about 10 atmospheres. Preferably, it is between about 12 and 100 atmospheres. However, the pressure can be as high as the equipment will withstand. The desired pressures are conveniently achieved simply by operating in closed vessels under the autogenous pressure of phosgene at the operating temperature. The vapor pressure of phosgene is 13.8 atmospheres at 100° C., 34.4 atmospheres at 150° C. and 56 atmospheres at 182° C., its critical temperature. It should be noted that the total pressure in the system will be higher than the vapor pressure of phosgene as the reaction progresses since two molecules of gas are formed for each molecule of phosgene which reacts. If desired, extraneous pressure of either phosgene or another gas, such as carbon dioxide or nitrogen, can be imposed on the system, but this is in general unnecessary.

The reaction proceeds only slowly at temperatures below about 100° C. and it is therefore desirable to operate above that temperature. The limiting factor with respect to the temperature is the decomposition point of the dicarboxylic acid chloride. In some cases, this is rather low. For example, adipyl chloride has a tendency to decompose above about 150° C. and it is advisable to operate below that temperature in this case. On the other hand, many dicarboxylic acid chlorides such as terephthaloyl chloride are quite stable at high temperatures. The decomposition point of most dicarboxylic acid chlorides can be found in the literature; if not, it is a matter of a very simple test to ascertain a safe temperature limit. Provided the decomposition point is not reached, a useful temperature range for the reaction is between 100 and 250° C. The reaction time will, of course, depend at least partly on the starting material but, in general, a reaction time of one to six hours will be sufficient to obtain good yields.

As has been shown, this method has the great advantage that no reaction catalysts need be used, thus simplifying the operations and decreasing the costs. If desired, however, the catalysts proposed by prior investigators in connection with the preparation of monocarboxylic acid chlorides can be used.

It is in general unnecessary to use reaction solvents or diluents. If desired, however, suitable inert media, liquid at the reaction temperature, can be used, such as aliphatic or aromatic hydrocarbons or halogenated hydrocarbons, e. g., n-hexane, kerosene, benzene, toluene, carbon tetrachloride, tetrachloroethane and the like.

Isolation of the dicarboxylic acid chloride can be carried out by any suitable means, such as distillation under reduced pressure or crystallization from an appropriate solvent. Since the yields are in general nearly quantitative, the crude reaction product can often be used directly without further treatment.

While the process of this invention is normally carried out batch-wise in corrosion-resisting autoclaves, it can also be carried out in a continuous manner using a flow system where the reaction mixture is in the hot zone for only a short period of time before being discharged. This is particularly advantageous when the dicarboxylic acid or chloride is sensitive to hydrogen chloride.

This invention provides a simple and economical method of preparing dicarboxylic acid chloride from the corresponding acids. As is known, these materials are of considerable use as intermediates in the preparation of many valuable monomeric or polymeric chemicals.

It will be appreciated that many modifications may be made in the processes described in the foregoing without departing from the scope or spirit of the invention. I intend to be limited only by the following patent claims:

I claim:

1. The process of preparing dicarboxylic acid chlorides which comprises reacting a dicarboxylic acid with phosgene in the ratio of at least 2 moles of phosgene per mole of dicarboxylic acid, the reaction being carried out under a phosgene pressure of at least 10 atmospheres and at a temperature of at least 100° C. but below the decomposition point of the dicarboxylic acid chloride.

2. The process of claim 1, wherein the phosgene pressure is between 12 and 100 atmospheres.

3. The process of claim 1, wherein the temperature is between 100° and 250° C.

4. The process of claim 1, wherein the reaction time is from 1 to 6 hours.

5. The process of claim 1, wherein the dicarboxylic acid comprises terephthalic acid.

6. The process of claim 1, wherein the dicarboxylic acid comprises adipic acid.

7. The process of claim 1, wherein the acid comprises a mixture of dicarboxylic acids.

8. The process of claim 1, wherein the dicarboxylic acids comprise a mixture of terephthalic and isophthalic acids.

9. The process of claim 1, wherein the dicarboxylic acids comprise a mixture of terephthalic and isocinchomeronic acids.

JAMES E. CARNAHAN.

References Cited in the file of this patent

UNITED STATES PATENTS

| Number | Name | Date |
| --- | --- | --- |
| 2,013,988 | Meder et al. | Sept. 10, 1935 |
| 2,013,989 | Meder et al. | Sept. 10, 1935 |
| 2,567,132 | Stilmar | Sept. 4, 1951 |